(12) United States Patent
Aggarwal et al.

(10) Patent No.: US 7,353,218 B2
(45) Date of Patent: Apr. 1, 2008

(54) METHODS AND APPARATUS FOR CLUSTERING EVOLVING DATA STREAMS THROUGH ONLINE AND OFFLINE COMPONENTS

(75) Inventors: Charu C. Aggarwal, Ossining, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 10/641,951

(22) Filed: Aug. 14, 2003

(65) Prior Publication Data

US 2005/0038769 A1 Feb. 17, 2005

(51) Int. Cl.
*G06F 7/00* (2006.01)
*G06F 17/30* (2006.01)
*G06F 17/00* (2006.01)

(52) U.S. Cl. .......................... 707/1; 707/102
(58) Field of Classification Search ............. 707/1–10, 707/102, 200; 700/273
See application file for complete search history.

(56) References Cited

U.S. PATENT DOCUMENTS

| | | | | |
|---|---|---|---|---|
| 5,257,206 A | * | 10/1993 | Hanson | 700/273 |
| 5,832,182 A | * | 11/1998 | Zhang et al. | 706/50 |
| 6,012,058 A | * | 1/2000 | Fayyad et al. | 707/6 |
| 6,092,072 A | * | 7/2000 | Guha et al. | 707/101 |
| 6,778,981 B2 | * | 8/2004 | Lee et al. | 707/3 |
| 6,801,917 B2 | * | 10/2004 | Gutta et al. | 707/102 |
| 6,915,241 B2 | * | 7/2005 | Kohlmorgen et al. | 702/189 |
| 6,947,933 B2 | * | 9/2005 | Smolsky | 707/6 |
| 7,194,454 B2 | * | 3/2007 | Hansen et al. | 707/3 |
| 2003/0097385 A1 | * | 5/2003 | Lee et al. | 708/1 |
| 2003/0154072 A1 | * | 8/2003 | Young et al. | 704/9 |
| 2004/0196287 A1 | * | 10/2004 | Wong et al. | 345/440 |

OTHER PUBLICATIONS

V. Ganti, Johannes Gehrke, Raghu Ramakrishnan Mining Data Streams under Block Evolution. SIGKDD Explorations 3(2): 1-10 (2002).*
Babcock et al., "Models and Issues in Data Stream Systems," ACM PODS Conference, pp. 1-30, 2002.
P. Domingos et al., "Mining High-Speed Data Streams," ACM SIGKDD Conference, 10 pages, 2000.
S. Guha et al., "Clustering Data Streams," IEEE FOCS Conference, pp. 1-8, 2000.
L. O'Callaghan et al., "Streaming-Data Algorithms For High-Quality Clustering," ICDE Conference, pp. 1-25, 2002.
P.S. Bradley et al., "Scaling Clustering Algorithms to Large Databases," SIGKDD Conference, 7 pages, 1998.
S. Guha et al., "CURE: An Efficient Clustering Algorithm for Large Databases," ACM SIGMOD Conference, pp. 73-84, 1998.
R.T. Ng et al., "Efficient and Effective Clustering Methods for Spatial Data Mining," Very Large Data Bases Conference, 12 pages, 1994.
T. Zhang et al., "BIRCH: An Efficient Data Clustering Method for Very Large Databases," ACM SIGMOD Conference, pp. 103-114, 1996.

* cited by examiner

*Primary Examiner*—Hosain Alam
*Assistant Examiner*—Shew-Fen Lin
(74) *Attorney, Agent, or Firm*—Mark Wardas; Ryan, Mason & Lewis, LLP

(57) ABSTRACT

A technique of clustering data of a data stream is provided. Online statistics are first created from the data stream. Offline processing of the online statistics is then performed when offline processing either required or desired. Online statistics may be created through the reception of data points from the data stream and the formation and updating of data groups. Offline processing may be performed by reclustering groups of data points around sampled data points and reporting the newly formed clusters.

13 Claims, 3 Drawing Sheets

US 7,353,218 B2

METHODS AND APPARATUS FOR CLUSTERING EVOLVING DATA STREAMS THROUGH ONLINE AND OFFLINE COMPONENTS

FIELD OF THE INVENTION

The present invention relates to data clustering and, more particularly, to the clustering of evolving data streams through generated online statistics and offline processing.

BACKGROUND OF THE INVENTION

Recent advances in hardware technology have allowed companies and organizations to automatically and rapidly record transactions of everyday life (e.g., banking, credit card, stock, telecommunications, etc.). The recordation of such processes leads to large amounts of data, which grows at an unlimited rate. The continuous arrival of data is referred to as a data stream. Data streams have been extensively researched in recent years due to their use in a wide range of applications, see, e.g., B. Babcock et al., "Models and Issues in Data Stream Systems," ACM PODS Conference, 2002; P. Domingos et al., "Mining High-Speed Data Streams," ACM SIGKDD Conference, 2000; S. Guha et al., "Clustering Data Streams," IEEE FOCS Conference, 2000; and L. O'Callaghan et al., "Streaming-Data Algorithms For High-Quality Clustering," ICDE Conference, 2002.

The clustering of a data stream partitions a given set of data points into one or more groups of similar data points. Clustering has been widely researched in the database, data mining and statistics communities, see, e.g., P. Bradley et al., "Scaling Clustering Algorithms to Large Databases," SIGKDD Conference, 1998; S. Guha et al., "CURE: An Efficient Clustering Algorithm for Large Databases," ACM SIGMOD Conference, 1998; R. Ng et al., "Efficient and Effective Clustering Methods for Spatial Data Mining," Very Large Data Bases Conference, 1994; R. Dubes et al., "Algorithms for Clustering Data," Prentice Hall, New Jersey, 1998; and L. Kaufman et al., "Finding Groups in Data—An Introduction to Cluster Analysis," Wiley Series in Probability and Math Sciences, 1990. Clustering has also been studied in the context of the data stream environment, see, e.g., S. Guha et al. and L. O'Callaghan et al.

Since the clustering of data streams results in the arrival of a large volume of data, it renders most traditional clustering methodologies inefficient. In recent years, one-pass clustering methodologies have been developed for utilization with data streams. However, the results of a simple one-pass clustering methodology provided over a data stream for a few years would be dominated by the outdated history of the stream.

Other existing methodologies for clustering data streams compute clusters over the entire data stream, see, e.g. L. O'Callaghan et al. These techniques view data stream clustering as a variant of one-pass clustering methodologies. Although such techniques may be useful in many clustering applications, the clustering of data streams requires careful defining in the data stream context. A data stream should be viewed as an infinite process having data that continuously evolves with time. As a result, the underlying clusters may also change considerably with time. The nature of the clusters may vary depending on the moment at which they are computed as well as the time horizon over which they are measured. For example, a user may wish to examine clusters occurring in the last month, year, or decade, each of which may be considerably distinct.

Data streams inherently impose a one-pass constraint on methodology design. It becomes very difficult to provide flexibility in computing clusters over different kinds of time horizons using conventional methodologies. For example, a direct extension of the stream based k-means methodology (see, e.g., L. O'Callaghan et al.) would require simultaneous maintenance of the intermediate results of clustering methodologies over all possible time horizons. Such a computational burden increases with progression of the data stream and can rapidly become a bottleneck for online implementation. Furthermore, in many cases, an analyst may wish to determine the clusters at a previous moment in time, and compare them to the current clusters. This requires even greater bookkeeping, which can rapidly become unwieldy for fast data streams.

Since a data stream cannot be revisited over the course of the computation, a clustering methodology needs to maintain a substantial amount of information so that important details are not lost. For example, a continuous version of k-means methodology maintains a number of cluster centers which change or merge as necessary throughout the execution of the methodology, see, e.g., L. O'Callaghan et al. This approach is unpredictable when the characteristics of the stream evolve over time since the k-means approach is highly sensitive to the order of arrival of the data points. For example, once two cluster centers are merged, there is no way to informatively split the clusters when required by the evolution of the stream at a later time.

A need therefore exists to improve the quality of the clusters when the data evolves considerably over time. A further need exists to provide greater functionality in discovering and exploring clusters over different portions of the stream.

SUMMARY OF THE INVENTION

The present invention relates to data clustering techniques. More particularly, the present invention relates to clustering evolving data streams through generated online statistics and offline processing.

For example, in one aspect of the invention, a technique of clustering data of a data stream comprises the following steps. First, online statistics are created from the data stream. Then, offline processing of the online statistics is performed when offline processing is either required or desired.

Advantageously, the inventive technique efficiently and effectively clusters data streams in a manner that is easily accessible and manageable by a user.

Another advantageous property of the inventive technique is its flexibility in computing clusters over user defined time periods. Additionally, the inventive technique may provide for the comparison of clusters in a previous moment in time to current clusters of a data stream. A user may discover and explore clusters over different portions of the data stream.

These and other objects, features, and advantages of the present invention will become apparent from the following detailed description of illustrative embodiments thereof, which is to be read in connection with the accompanying drawings.

DETAILED DESCRIPTION OF THE INVENTION

Figure 1:
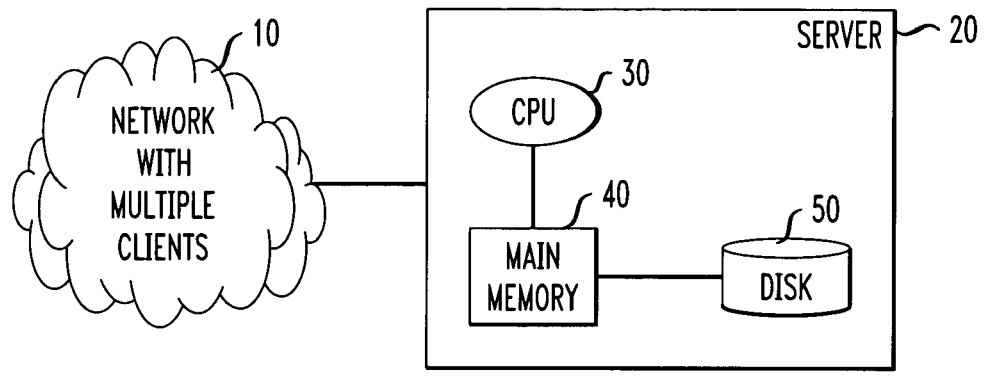
FIG. 1 is a block diagram illustrating a hardware implementation suitable for employing methodologies, according to an embodiment of the present invention.

The following description will illustrate the invention using an exemplary data processing system architecture. It should be understood, however, that the invention is not limited to use with any particular system architecture. The invention is instead more generally applicable to any data processing system in which it is desirable to perform efficient and effective data stream clustering.

In order to perform data stream clustering, statistical information about the data locality is maintained in terms of micro-clusters. These statistical data points are defined as a temporal extension of the cluster feature vector, see, e.g., T. Zhang et al., "BIRCH: An Efficient Data Clustering Method for Very Large Databases," ACM SIGMOD Conference, 1996. Micro-clusters are utilized in data stream clustering due to their additivity property. The micro-clusters are stored as snapshots in time which follow a specific pattern. This pattern provides an effective trade-off between the storage requirements and the ability to recall summary statistics from different time horizons. The summary information in the micro-clusters is then used by an offline component which is dependent upon a wide variety of user inputs, such as the time horizon or the granularity of clustering.

Therefore, in accordance with the present invention, data stream clustering is separated into an online micro-clustering component and an offline macro-clustering component. The online micro-clustering component employs an efficient methodology for storage of appropriate summary statistics in a fast data stream. The offline component uses these summary statistics in conjunction with other user input in order to provide the user with a quick understanding of the clusters whenever required. The offline component is efficient since the component uses the summary statistics as input. This two-phased approach also provides the user with the flexibility to explore the nature of the evolution of the clusters over different time periods.

It is assumed that the data stream comprises a set of multi-dimensional records $X_1 \ldots X_k \ldots$, arriving at time stamps $T_1 \ldots T_k \ldots$. Each $X_i$ is a multi-dimensional record containing d dimensions which are denoted by $X_i = x_i^1 \ldots x_i^d$.

A micro-cluster for a set of d-dimensional points $X_{i_1} \ldots X_{i_n}$ with time stamps $T_{i_1} \ldots T_{i_n}$ is defined as the 2·d+3 tuple ($\overline{CF2^x}$, $\overline{CF1^x}$, $CF2^t$, $CF1^t$, n), wherein $\{\overline{CF2^x}\}$ and $\{\overline{CF1^x}\}$ each correspond to a vector of d entries. The definition of each of these entries is as follows:

For each dimension, the sum of the squares of the data values is maintained in $\{\overline{CF2^x}\}$. Thus, $\{\overline{CF2^x}\}$ contains d values. The p-th entry of $\{\overline{CF2^x}\}$ is equal to $$\sum_{j=1}^{n} (x_{i_j}^p)^2;$$

For each dimension, the sum of the data values is maintained in $\{\overline{CF1^x}\}$. Thus, $\{\overline{CF1^x}\}$ contains d values. The p-th entry of $\{\overline{CF1^x}\}$ is equal to $$\sum_{j=1}^{n} x_{i_j}^p;$$

The sum of the squares of the time stamps $T_{i_1} \ldots T_{i_n}$ is maintained in $CF2^t$;

The sum of the time stamps $T_{i_1} \ldots T_{i_n}$ is maintained in $CF1^t$; and The number of data points is maintained in n.

The micro-clusters definition is a temporal extension of the cluster feature vector. The micro-cluster for a set of points C is denoted by CFT(C). This summary information is a natural choice for data stream methodologies since it can be expressed in an additive way over the different data points. At a given moment in time, statistical information about the dominant micro-clusters in the data stream is maintained by the methodology. The methodology ensures that a very large number of micro-clusters can be efficiently maintained as compared to previous methods, see, e.g., L. O'Callaghan et al. The high granularity of the online updating methodology ensures that it is able to provide clusters of much better quality in an evolving data stream.

The micro-clusters are stored at particular moments in the stream which are referred to as snapshots. The offline macro-clustering methodology uses these finer level micro-clusters in order to create higher level clusters over specific time horizons. A user may wish to find clusters in the stream based on a history of length h when a clock time is $t_c$. The macro-clustering methodology uses subtractive properties of the micro-clusters stored as snapshots $t_c$ and ($t_c$–h) in order to find the higher level clusters in a history or time horizon of length h. The subtractive property is a very important characteristic of the micro-clustering representation which makes it feasible to generate higher level clusters over different time horizons. Since it is not possible to store the snapshots at each and every moment in time, it is important to choose particular times at which the micro-clusters are stored. The aim of choosing these particular times is to ensure that clusters in any user specified time horizon ($t_c$–h, $t_c$) can be approximated.

In a pyramidal time frame, snapshots are stored at differing levels of granularity depending upon the recency. Snapshots are classified into different orders, which can vary from 1 to log(T), where T is the clock time elapsed since the beginning of the stream. The order of a particular class of snapshots defines the level of granularity in time at which the snapshots are maintained. The snapshots of different orders are maintained as follows:

Snapshots of the i-th order occur at time intervals of $a^i$, where a is an integer and $a \geq 1$. Specifically, each snapshot of the i-th order is taken at a moment in time when the clock value from the beginning of the stream is exactly divisible by $a^i$. One unit of clock time is the smallest level of granularity. Thus, the 0-th order snapshots measure the time intervals at the smallest level of granularity.

At any given moment in time, the last a +1 snapshots of order i are stored.

The above definition allows for considerable redundancy in storage of snapshots. For example, the clock time of 8 is divisible by $2^0$, $2^1$, $2^2$ and $2^3$ (where a=2). Therefore, the state of the micro-clusters at a clock time of 8 simultaneously corresponds to order 0, order 1, order 2 and order 3 snapshots.

Referring initially to FIG. 1, a block diagram illustrates a hardware implementation suitable for employing methodologies, according to an embodiment of the present invention. As illustrated, an exemplary system comprises client devices coupled via a large network 10 to a server 20. Server 20 may comprise a central processing unit (CPU) 30 coupled to a main memory 40 and a disk 50. It is assumed that multiple clients can interact with server 20 over large network 10. It is to be appreciated that network 10 may be a public information network such as, for example, the Internet or World Wide Web, however, the clients and server may alternatively be connected via a private network, a local area network, or some other suitable network.

The data clustering computations of the invention are performed at CPU 30 on server 20 and sent to one or more client devices. Client devices make queries about various characteristics of the data stream which are responded to by server 20. All or portions of the data sets to be processed are stored on disk 50 during processing. Main memory 40 is used to store some or all of the statistics created during the processing. Results are returned to requesting client devices.

In one preferred embodiment, software components including instructions or code for performing the methodologies of the invention, as described herein, may be stored in one or more memory devices described above with respect to the server and, when ready to be utilized, loaded in part or in whole and executed by CPU 30.

Figure 2:
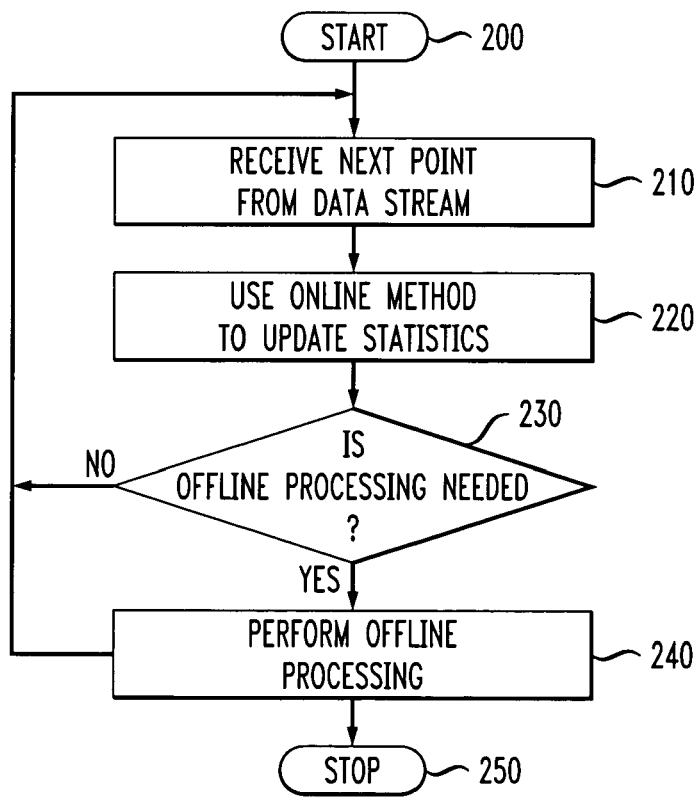
FIG. 2 is a flow diagram illustrating an online micro-clustering and offline macro-clustering interaction methodology, according to an embodiment of the present invention.

Referring now to FIG. 2, a flow diagram illustrates an online micro-clustering and offline macro-clustering interaction methodology, according to an embodiment of the present invention. The methodology begins at step 200 where a data stream is input. In step 210, a data point is received from the data stream. This data point is used to update online statistics in step 220. This online micro-clustering step is described in more detail in FIG. 3. In step 230, it is determined whether offline processing is required for the purpose of analysis of clusters. If offline processing is required, then it is performed in step 240. This offline macro-clustering step is described in greater detail in FIG. 4. The methodology then returns to step 210. If offline processing is not required, the methodology returns directly to step 210. The methodology terminates at step 250 when data points are no longer received from the data stream.

Figure 3:
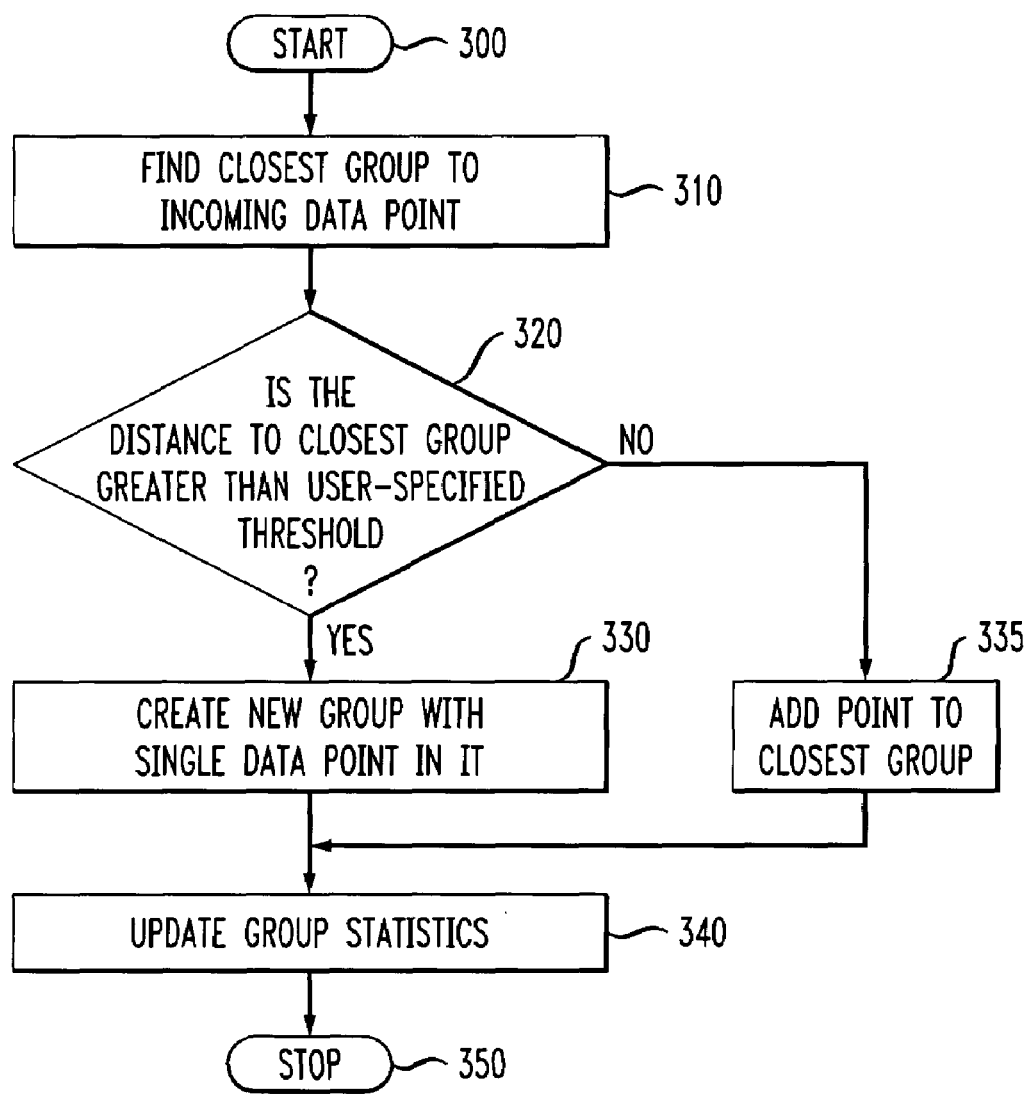
FIG. 3 is a flow diagram illustrating a micro-cluster maintenance methodology, according to an embodiment of the present invention.

Referring now to FIG. 3, a flow diagram illustrates a micro-cluster maintenance methodology, according to an embodiment of the present invention. This figure may be considered a detailed description of step 220 in FIG. 2. The methodology begins at step 300 where a data point from a data stream is input. In step 310, a group of data points closest to the incoming data point is found. In step 320, it is determined whether the distance to the closest group is greater than a user-specified threshold. If the distance is greater than the threshold, then a new group is created with a single data point in it in step 330. A new group would also be created if no groups exist. If the distance is less than the threshold, the data point is added to the closest group in step 335. In either case, the updated or new group statistics are updated in step 340. In updating the group statistics, the counts of the data points in the micro-clusters are updated. In addition, when the appropriate time window has elapsed, snapshots are explicitly stored. The methodology terminates at step 350.

Figure 4:
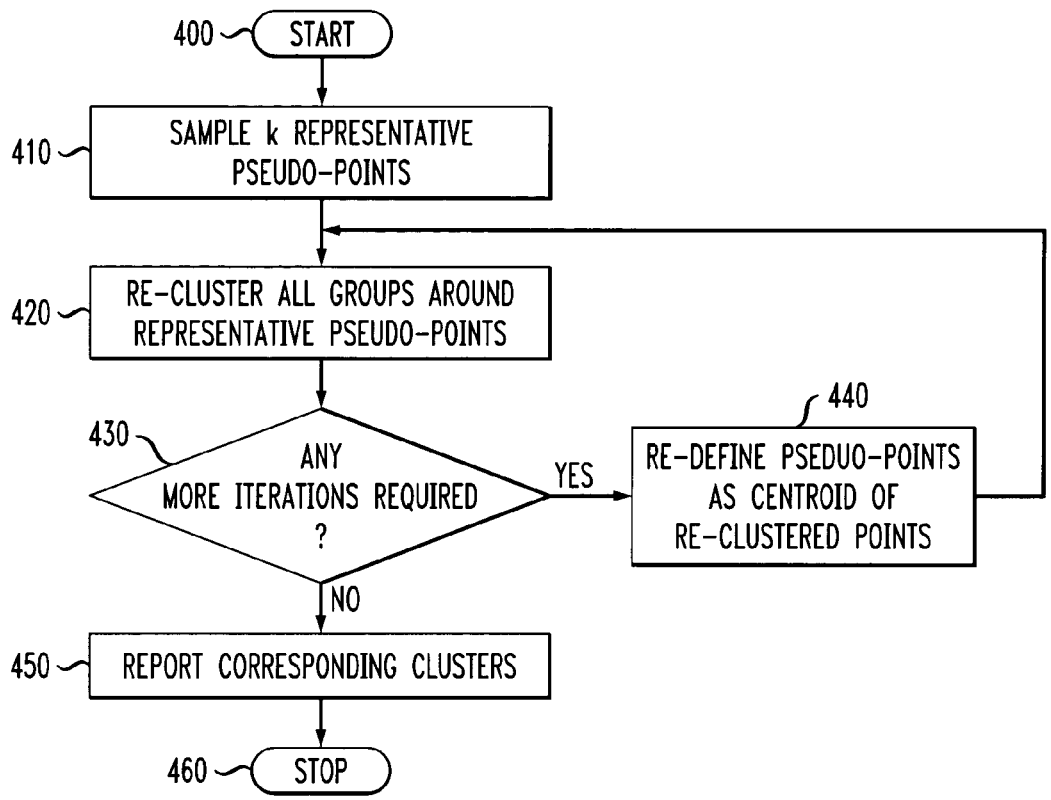
FIG. 4 is a flow diagram illustrating a higher level cluster creation methodology, according to an embodiment of the present invention.

Referring now to FIG. 4, a flow diagram illustrates a higher level cluster creation methodology, according to an embodiment of the present invention. Higher level macro-clusters are created from the fine grained micro-clusters in FIG. 3. This step is executed as an offline process when the user wants a picture of the higher level clusters in the data stream. This methodology can also be considered a detailed description of step 240 in FIG. 2. The methodology begins at step 400. In step 410, the inventive technique samples k representative pseudo-points. In step 420, micro-cluster groups are re-clustered around the representative pseudo-points. Each micro-cluster group is assigned to its closest representative pseudo-point. This methodology is an iterative process. The number of such iterations is decided by the user apriori. In step 430, it is determined whether any more iterations are required. If more iterations are required, the representative pseudo-points are redefined as the centroid of re-clustered points in step 440. The methodology then returns to step 420. If more iterations are not required, the methodology reports the corresponding clusters that have been found by the re-clustering methodology in step 450. These clusters could also be created over a user-specified time period by determining the relevant groups over the time period and then re-creating the clusters. The methodology terminates at step 460.

Figure 5:
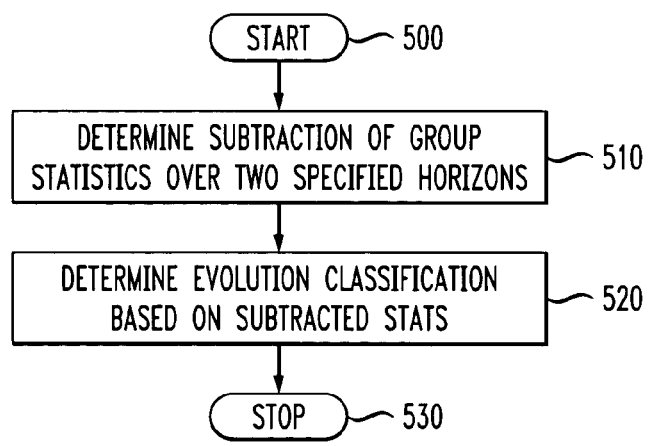
FIG. 5 is a flow diagram illustrating a micro-cluster evolution analysis methodology, according to an embodiment of the present invention.

Referring now to FIG. 5, a flow diagram illustrates a micro-cluster evolution analysis methodology, according to an embodiment of the present invention. The methodology begins at step 500. In step 510, a subtraction methodology is performed over the appropriate time horizon. In the subtraction methodology, the micro-cluster statistics for the previous time horizon are subtracted from the current micro-cluster statistics. In step 520, the methodology determines the evolution classification based on the subtracted statistics. For example, when a cluster group is present at time $t_1$, but not present at time $t_2 > t_1$, it means that the group has been deleted in the interval $(t_1, t_2)$. On the other hand, if $t_1 > t_2$, then it means that a new group has been created in the interval $(t_2, t_1)$. The methodology terminates at step 530.

Accordingly, as described herein, the present invention provides an effective and efficient method for clustering large evolving data streams. The method has clear advantages over existing techniques, which try to cluster the whole stream at one time rather than viewing the stream as a changing process over time. The clustering model provides a wide variety of functionality in characterizing data stream clusters over different time horizons in an evolving environment. This is achieved through a careful division of labor between the online statistical data collection component and an offline analytical component. Thus, the methodology provides considerable flexibility to an analyst in a real-time and changing environment.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of clustering data of a data stream of electronic consumer transactions comprising the steps of:

receiving at least one data point from the data stream;

assigning the at least one data point to one of a plurality of groups of data points;

updating and storing online statistics of the one of the plurality of groups of data points, wherein the online statistics comprise lower-level clusters;

determining whether offline processing is one of required and desired for analysis of the lower-level clusters;

performing offline processing of the online statistics through at least one re-clustering of the plurality of groups of data points around at least one sampled pseudo-point to create higher-level clusters, when offline processing is one of required and desired;

utilizing the online statistics to monitor data stream evolution by performing offline processing to subtract online statistics over specified horizons, and to determine evolution classification based on subtracted statistics;

reporting the higher-level clusters of electronic consumer transactions for analysis by a user; and repeating the receiving, assigning, updating and determining steps when offline processing is not one of required and desired.

2. The method of claim 1, wherein the step of assigning the at least one data point comprises the steps of:

finding a group of data points of the plurality of groups of data points closest to the at least one data point;

determining if a distance to the closest group of data points is greater than a threshold;

creating a new group having the at least one data point if the distance to the closest group of data is greater than the threshold; and adding the at least one data point to the closest group of data points if the distance to the closest group of data points is less than threshold.

3. The method of claim 1, wherein the step of performing offline processing comprises the steps of:

sampling a defined number of pseudo-points;

re-clustering the plurality of groups of data points around the sampled pseudo-points;

determining if additional iterations of sampling and re-clustering are required;

redefining the sampled pseudo-points as centroids of the plurality of re-clustered groups of data points if additional iterations are required, before re-clustering the plurality of groups of data points around the redefined sampled pseudo-points; and reporting clusters formed in the re-clustering.

4. The method of claim 1, wherein the step of performing offline processing comprises the step of re-clustering lower level clusters.

5. The method of claim 1, wherein the step of utilizing the online statistics to monitor data stream evolution comprises the step of comparing the online statistics at two different horizons.

6. The method of claim 1, further comprising the step of storing online statistics at specific times depending upon a pyramidal distribution.

7. Apparatus for clustering data of a data stream of electronic consumer transactions, the apparatus comprising:

a memory; and at least one processor coupled to the memory and operative to: (i) receive at least one data point from the data stream; (ii) assign the at least one data point to one of a plurality of groups of data points; (iii) update and store online statistics of the one of the plurality of groups of data points, wherein the online statistics comprise lower-level clusters; (iv) determine whether offline processing is one of required and desired for analysis of the lower-level clusters; (v) perform offline processing of the online statistics through at least one re-clustering of the plurality of groups of similar data points around at least one sampled pseudo-point to create higher-level clusters, when offline processing is one of required and desired; (vi) utilize the online statistics to monitor data stream evolution by performing offline processing to subtract online statistics over specified horizons, and to determine evolution classification based on subtracted statistics; (vii) report the higher-level clusters of electronic consumer transactions for analysis by a user; and (viii) repeat the receiving, assigning, updating and determining steps, when offline processing is not one of required and desired.

8. The apparatus of claim 7, wherein the operation of updating online statistics is operative to:

find a group of data points of the plurality of groups of data points closest to the at least one data point;

determine if a distance to the closest group of data points is greater than a threshold;

create a new group having the at least one data point if the distance to the closest group of data points is greater than the threshold; and add the at least one data point to the closest group of data points if the distance to the closest group of data points is less than the threshold.

9. The apparatus of claim 7, wherein the operation of performing offline processing is operative to:

sample a defined number of pseudo-points;

re-cluster the plurality of groups of data points around the sampled pseudo-points;

determine if additional iterations of sampling and re-clustering are required;

redefine the sampled pseudo-points as centroids of the plurality of re-clustered groups of data points if additional iterations are required, before re-clustering the plurality of groups of data points around the redefined sampled pseudo-points; and report clusters formed in the re-clustering.

10. The apparatus of claim 7, wherein the operation of performing offline processing is operative to re-cluster lower level clusters.

11. The apparatus of claim 7, wherein the operation of utilizing the online statistics to monitor data stream evolution is operative to compare the online statistics at two different horizons.

12. The apparatus of claim 7, wherein the at least one processor is further operative to store online statistics at specific times depending upon a pyramidal distribution.

13. An article of manufacture for clustering data of a data stream of electronic consumer transactions, comprising a machine readable medium containing one or more programs which when executed implement the steps of:

receiving at least one data point from the data stream;

assigning the at least one data point to one of a plurality of groups of data points;

updating and storing online statistics of the one of the plurality of groups of data points wherein the online statistics comprise lower-level clusters;

determining whether offline processing is one of required and desired for analysis of the lower-level clusters;

performing offline processing of the online statistics through at least one re-clustering of the plurality of groups of data points around at least one sampled pseudo-point to create higher-level clusters, when offline processing is one of required and desired;

utilizing the online statistics to monitor data stream evolution by performing offline processing to subtract online statistics over specified horizons, and to determine evolution classification based on subtracted statistics;

reporting the higher-level clusters of electronic consumer transactions for analysis by a user; and repeating the receiving, assigning, updating and determining steps when offline processing is not one of required and desired.

* * * * *